United States Patent
Bacic et al.

(10) Patent No.: US 9,828,869 B2
(45) Date of Patent: Nov. 28, 2017

(54) CONTROL OF A GAS TURBINE ENGINE

(71) Applicant: ROLLS-ROYCE PLC, London (GB)

(72) Inventors: Marko Bacic, Oxford (GB); Glenn Alexander Knight, Derby (GB); Parag Vyas, Nottingham (GB); Sean Patrick Ellis, Derby (GB)

(73) Assignee: ROLLS-ROYCE plc, London (GB)

( * ) Notice: Subject to any disclaimer, the term of this patent is extended or adjusted under 35 U.S.C. 154(b) by 530 days.

(21) Appl. No.: 14/537,382

(22) Filed: Nov. 10, 2014

(65) Prior Publication Data

US 2015/0159499 A1    Jun. 11, 2015

(30) Foreign Application Priority Data

Dec. 5, 2013    (GB) .................................. 1321472.1

(51) Int. Cl.
| | | |
|---|---|---|
| *G06F 19/00* | (2011.01) | |
| *F01D 11/14* | (2006.01) | |
| *F01D 11/20* | (2006.01) | |
| *F02C 9/28* | (2006.01) | |
| *F02C 9/00* | (2006.01) | |

(52) U.S. Cl.
CPC .............. *F01D 11/14* (2013.01); *F01D 11/20* (2013.01); *F02C 9/00* (2013.01); *F02C 9/28* (2013.01); *F05D 2270/02* (2013.01); *F05D 2270/04* (2013.01); *F05D 2270/051* (2013.01); *F05D 2270/20* (2013.01); *F05D 2270/309* (2013.01); *F05D 2270/44* (2013.01)

(58) Field of Classification Search
CPC .................................. F01D 11/14; F01D 11/20
See application file for complete search history.

(56) References Cited

U.S. PATENT DOCUMENTS

| | | | | |
|---|---|---|---|---|
| 4,765,742 | A | * | 8/1988 | Davinson ............... G01B 11/14 |
| | | | | 250/227.28 |
| 8,126,628 | B2 | | 2/2012 | Hershey et al. |
| 2005/0274115 | A1 | | 12/2005 | Pearce |
| 2008/0069683 | A1 | | 3/2008 | Nigmatulin et al. |
| 2014/0365036 | A1 | * | 12/2014 | Moeckly ................... F02C 9/00 |
| | | | | 701/3 |

FOREIGN PATENT DOCUMENTS

| | | |
|---|---|---|
| EP | 0 056 341 A1 | 7/1982 |
| EP | 1 013 891 A1 | 6/2000 |
| WO | 93/12331 A1 | 6/1993 |

OTHER PUBLICATIONS

Search Report issued in United Kingdom Application No. GB1321472.1 dated Sep. 17, 2014.
Apr. 2, 2015 Search Report issued in European Patent Application No. 14 19 2462.

* cited by examiner

*Primary Examiner* — Adam Alharbi
(74) *Attorney, Agent, or Firm* — Oliff PLC (57) ABSTRACT

A thrust demand signal is provided to a processor of a gas turbine engine and is modified, according to growth time constants of a rotor and/or a casing of the engine, in order to control the rotational speed or the rate of change of rotational speed of the engine so as to prevent contact between the rotor and the casing.

19 Claims, 9 Drawing Sheets

CONTROL OF A GAS TURBINE ENGINE

The present invention relates to a method and apparatus for controlling a gas turbine engine. In particular, the invention relates to modifying a thrust demand in order to control a gas turbine engine.

In a gas turbine engine, leakage of working fluid can occur between the tips of rotating turbine blades and the surrounding annular casing or shroud of the engine. Working fluid that leaks in this way does no useful work and therefore reduces the efficiency of the engine and increases fuel consumption. It is therefore desirable to minimize the clearance between the blade tips and the shroud in order to minimize the leakage and thereby reduce fuel consumption.

At the same time, it is important to ensure that sufficient tip clearance exists to prevent the blade tips from coming into contact with the shroud, since so called "tip rub" reduces engine efficiency and increases component wear and therefore maintenance costs.

Maintaining a minimum clearance while preventing tip rub is not straightforward because the high temperatures encountered in the engine cause significant thermal expansion of engine components, including the turbine blades and the discs on which they are mounted. Furthermore, the turbine blades tend to expand more quickly than do the turbine discs as the rotational speed of the engine is increased. In addition, mechanical growth of the turbine blades and discs occurs due to the large centrifugal forces to which they are subjected as they rotate at high speeds.

The annular shroud, which unlike the turbine is not exposed to large centrifugal loads, also experiences thermal expansion as it is heated by the working fluid of the engine. The rate and magnitude of the thermal expansion of the shroud is usually greater than that of the turbine discs because the shroud is constructed from different materials.

Consequently, there tends to be a mismatch between the amount and rate of expansion of the turbine rotors and the engine casing. This differential effect is accentuated during engine transients. For example, on engine acceleration the shroud typically expands more quickly than the turbine discs, while the turbine blades grow even more rapidly than the shroud. On engine deceleration the reverse is true. In an aircraft, these engine transients result from changing thrust demands on the engine, for example to perform aircraft manoeuvres such as take-off, climb, descent or landing.

Some means of control is therefore useful to maintain a minimum clearance between the blade tips and the shroud during engine operation. To this end, various control systems have been proposed which control the thermal expansion and contraction of the engine casing or shroud. In large civil aircraft engines, this is typically achieved by taking cooling air from the fan stream or from an early compressor stage and feeding this air to a manifold which encircles the engine at or near the plane of the turbine stage. On exit from the manifold, the air impinges on the outside of the turbine stage shroud, causing it to contract radially and so reduce the rotor blade tip clearance. Such a method of tip clearance control can be either active or passive and both can be controlled by modulated cooling airflow.

However, these methods of tip clearance control might not be able to prevent tip rub during certain engine transients, for example rapid engine acceleration, because the turbine blades may expand more quickly than the shroud.

U.S. Pat. No. 8,126,628 attempts to address this problem by adjusting the blade tip clearance, in an aircraft gas turbine engine, in anticipation of and before an engine command that changes an engine rotational speed. That is, the system anticipates the onset of an engine transient, for example an increase in thrust required for the aircraft to climb, in order to start contraction of the engine shroud at some period of time before the engine transient, with the aim of adjusting the shroud at a rate which exceeds the growth rate of the turbine blades, thereby reducing the possibility of tip rub while maintaining the smallest possible tip clearance.

In some circumstances, however, the anticipation of engine transients may be problematic because it requires significant amounts of statistical data which has to be obtained from external sources, for example weather conditions reported by other aircraft in the vicinity. This information could be incomplete or imprecise and as such might not provide reliable data to the system. In addition, a considerable volume of information will need to be gathered which could be prohibitively difficult and expensive in terms of data handling and processing. Moreover, the system may not be able to anticipate certain engine transients, for example those associated with a demand from the aircraft autothrottle when unexpected clear air turbulence is encountered. In such circumstances, engine transients may still lead to tip rub.

It is an object of the present invention to alleviate the problems of the prior art at least to some extent.

The invention is set out in the accompanying claims.

According to an aspect of the invention, there is provided a method of controlling a gas turbine engine, comprising: providing a thrust demand signal to a processor which is arranged to control the gas turbine engine; and modifying the thrust demand signal, according to growth time constants of a rotor and/or a casing of the gas turbine engine, in order to control the rotational speed or the rate of change of rotational speed (acceleration) of the gas turbine engine so as to prevent contact between the rotor and the casing.

The ability to modify the thrust demand signal, taking account of the growth (expansion/contraction) rates of the rotor and/or casing, means that tip rub may be avoided even in situations where an engine transient cannot be reliably anticipated, for example when an aircraft requires an adjustment in engine thrust in response to unexpected air turbulence.

The processor may be an element of a flight management system of an aircraft, optionally an element of an autothrottle, or may be an element of an electronic engine controller, for example a full authority digital engine controller. Thus, the invention may be implemented either within the engine control system or within the wider aircraft control system, thereby offering flexibility to the engine and airframe manufacturers.

Modifying the thrust demand signal may comprise applying a delay to the thrust demand signal so as to allow a gap between the rotor and the casing to be adjusted before the demanded thrust is applied. Optionally, the duration of the delay is determined according to a threshold value of the thrust demand signal. Alternatively, modifying the thrust demand signal may comprise applying a thrust rate limit to the thrust demand signal. Alternatively, modifying the thrust demand signal may comprise applying both of a delay and a thrust rate limit to the thrust demand signal.

Applying the thrust rate limit may comprise applying an acceleration modifier to an acceleration schedule set point in an acceleration controller of the electronic engine controller.

The gas turbine engine may be an aircraft engine and applying the thrust rate limit to the thrust demand signal may include selecting a thrust rate limit according to aircraft and/or engine parameters, for example aircraft altitude and pressure and/or temperature of the engine rotor stages. This may enable the selection of a thrust rate limit value which is the most appropriate under the particular engine and aircraft conditions.

The method may comprise the step of determining whether the gas turbine engine can be operated in a first mode, in which the thrust demand signal is modified according to growth time constants of the rotor and/or a casing of the gas turbine engine in order to control the rotational speed or the rate of change of rotational speed of the gas turbine engine so as to prevent contact between the rotor and the casing, or a second mode, in which the gas turbine engine is controlled in accordance with the thrust demand signal.

The determination may comprise operating the gas turbine engine in either the first mode or the second in accordance with a schedule on the basis of at least one of aircraft airspeed, aircraft weight, aircraft minimum airspeed, margin to stall, and maximum angle of attack, likelihood of turbulence, a signal from a traffic collision avoidance system, and windshear. Advantageously, the inventive method enables the engine to be controlled in accordance with the modified thrust demand signal only in situations where the aircraft performance margin is sufficient to permit necessary aircraft manoeuvres when in this mode.

The step of modifying the thrust demand signal may comprise applying a delay to the thrust demand signal and/or applying a thrust rate limit having a value in accordance with a schedule on the basis of at least one of aircraft airspeed, aircraft minimum airspeed, aircraft maximum angle of attack limit, aircraft weight, and aircraft margin to stall. Advantageously, the amount of thrust demand delay/the thrust rate limit can be modified in accordance with aircraft weight and/or speed, such that the aircraft performance margin is maintained within safe limits. Furthermore, this method can enable the switch between the first and second modes to be gradual.

According to another aspect of the invention, there is provided a computer program, having instructions adapted to carry out a method of controlling a gas turbine engine as described hereinabove. Advantageously, the control method may be programmed into an existing computer, for example an engine controller or an aircraft flight management system. In other words, the inventive method is "retrofittable".

According to another aspect of the invention, there is provided a computer readable medium, having a computer program recorded thereon, wherein the computer program is adapted to make the computer execute a method of controlling a gas turbine engine as described hereinabove.

According to another aspect of the invention, there is provided a processor for controlling a gas turbine engine, being configured to receive a thrust demand signal and comprising a signal modifier which is adapted to modify the thrust demand signal, according to growth time constants of a rotor and/or a casing of the gas turbine engine, in order to control the rotational speed or the rate of change of rotational speed of the gas turbine engine so as to prevent contact between the rotor and the casing.

The signal modifier may comprise a delay which is applicable to the thrust demand signal. Optionally, the duration of the delay is determined according to a threshold value of the thrust demand signal. Alternatively, the signal modifier may comprise a thrust rate limit which is applicable to the thrust demand signal. Alternatively, the signal modifier may comprise both of a delay and a thrust rate limit which are applicable to the thrust demand signal.

The thrust rate limit may comprise an acceleration modifier which is applicable to an acceleration schedule set point in an acceleration controller of the processor.

According to another aspect of the invention, there is provided an aircraft flight management system comprising a processor as described hereinabove.

According to another aspect of the invention, there is provided an electronic engine controller, for example a full authority digital engine controller, comprising a processor as described hereinabove.

According to another aspect of the invention, there is provided a gas turbine engine control system, comprising a processor as described hereinabove.

Embodiments of the invention will now be described by way of example, with reference to the accompanying figures in which.

Figure 1:
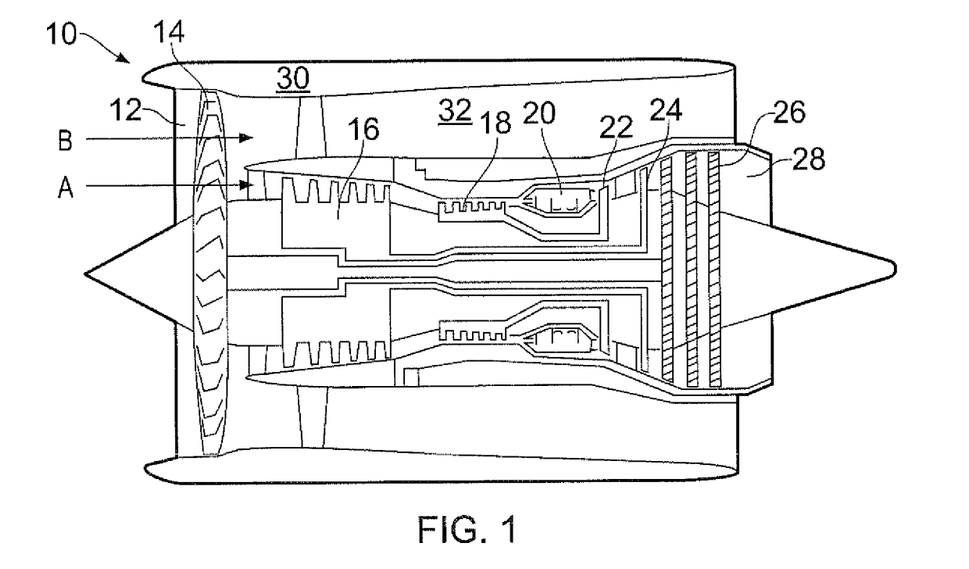
FIG. 1 is a sectional side view of a gas turbine engine.

The gas turbine engine 10 in FIG. 1 comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. Each of the fan 14, intermediate pressure compressor 16, high pressure compressor 18, high pressure turbine 22, intermediate pressure turbine 24 and low pressure turbine 26 comprises one or more rotor stages.

Figure 2:
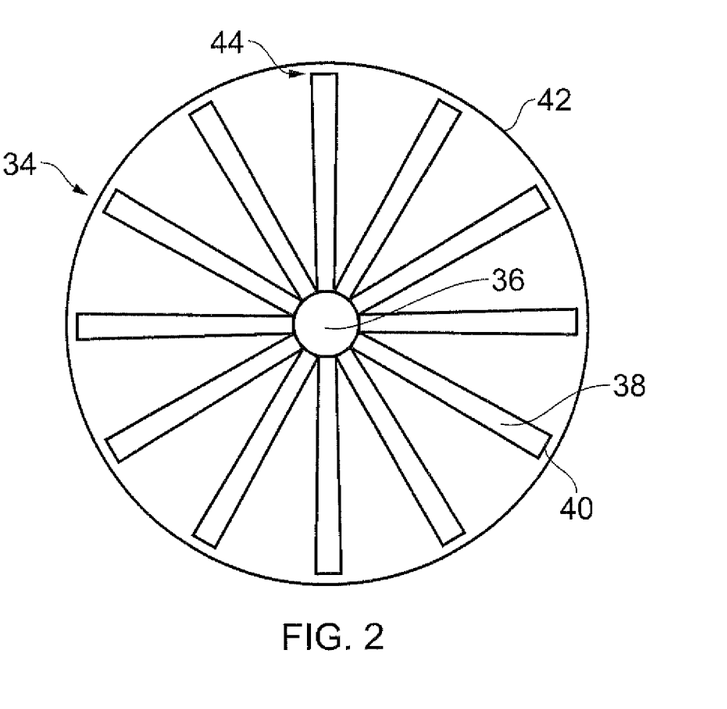
FIG. 2 is a schematic illustration of a rotor stage of the engine of FIG. 1.

Referring to FIG. 2, a rotor stage 34 comprises a rotor hub 36 from which radiates a plurality of blades 38, each comprising a blade tip 40 at the radially distal end from the hub 36. Radially outside the blade tips 40 is a rotor stage casing or shroud 42, which may include a segment assembly comprising a plurality of segments forming its radially inner surface as will be understood by those skilled in the art. Between the blade tips 40 and the rotor stage casing 42 is a clearance or gap 44.

In use of the gas turbine engine 10, working fluid (air) does work on the rotor blades 38 as it passes substantially axially through the engine 10. Working fluid that passes over the blade tips 40 through the clearance 44 does no useful work and therefore reduces the efficiency of the engine 10 and increases fuel consumption. However, the clearance 44 is necessary to prevent the blade tips 40 from rubbing against the rotor stage casing 42 which causes damage to one or both components. Tip rub is a transient effect because the rub erodes the blade tip 40 or casing 42 surface which results in the clearance 44 being increased and therefore the engine efficiency reducing.

Additionally the clearance 44 is not constant throughout use of the gas turbine engine 10. Taking the example of a gas turbine engine 10 used to power an aircraft, the rotor stage 34 components grow and shrink in response to centrifugal forces and temperature changes resulting from different engine operating conditions. Thus when the engine 10 is cold, before use, the rotor blades 38 have a defined radial length and the rotor stage casing 42 has a defined diameter and is annular. The components each grow or shrink by different amounts and with a different time constant governing the speed at which the growth or shrinkage occurs. The growth due to centrifugal forces is substantially instantaneous.

Figure 3:
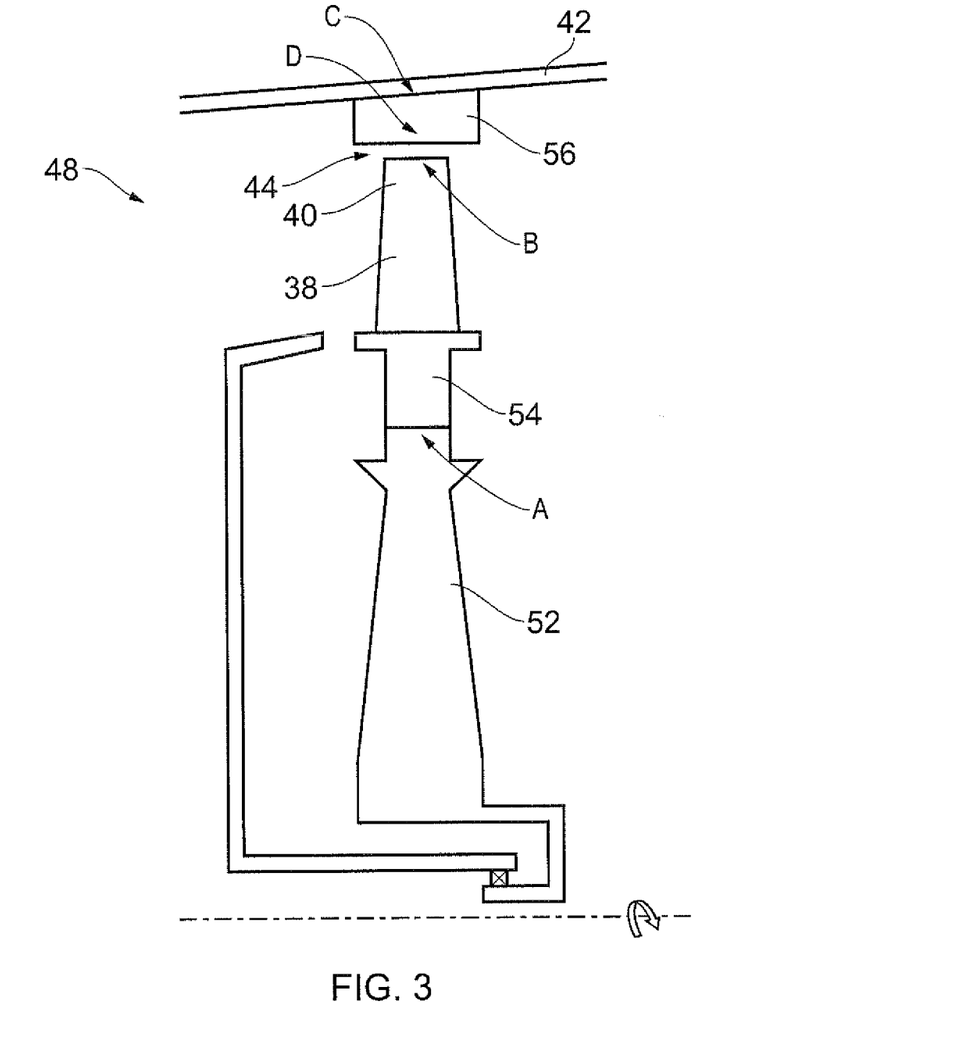
FIG. 3 is a schematic illustration of an enlargement of a part of the rotor stage of FIG. 2.

FIG. 3 is an enlargement 48 of part of the rotor stage 34. The hub 36 is formed as a disc 52 upon which the plurality of rotor blades 38 is mounted. Each rotor blade 38 includes an integral blade root 54 which comprises suitable features, such as a fir tree shape, to enable secure mounting to the disc 52. Except where distinction is required the term rotor blade 38 in this description should be understood to include the blade root 54. In this embodiment, the rotor stage casing 42 has a segment assembly 56 on its radially inner surface. The segment assembly 56 is comprised of a plurality of discontinuous segments in a circumferential array. The segments may be actively or passively controlled to move radially inwardly or outwardly to change the clearance 44 between them and the blade tips 40. The segments may be controlled by a combination of active and passive means; for example, passive segment actuation combined with active cooling air modulation or vice versa.

The segment assembly 56 grows radially inwardly whereas the rotor stage casing 42 and disc 52 grow radially outwardly and the rotor blades 38 elongate radially. Thus the clearance 44 reduces during engine acceleration phases of the flight such as ramp-up and the start of take-off. Similarly, the clearance 44 increases during engine deceleration phases. There is a settling period after an engine acceleration or deceleration during which the clearance 44 may fluctuate before settling to a steady-state clearance 44.

Active or passive tip clearance control arrangements may be applied to reduce the variation of clearance 44. For example cool air can be selectively delivered to passages in the rotor stage casing 42 to cool the rotor stage casing 42 and thereby reduce the diameter or retard the growth of the diameter. Alternatively the segment assembly 56 radially inside the rotor stage casing 42 can be moved mechanically to change the clearance 44.

Figure 4:
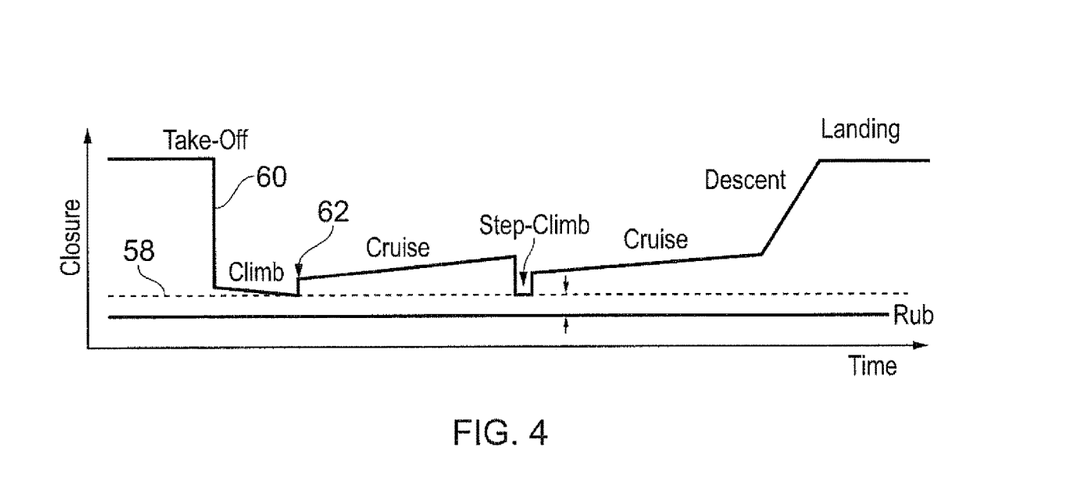
FIG. 4 is a schematic graph of rotor tip clearance against flight phases of an aircraft.
Figure 5:
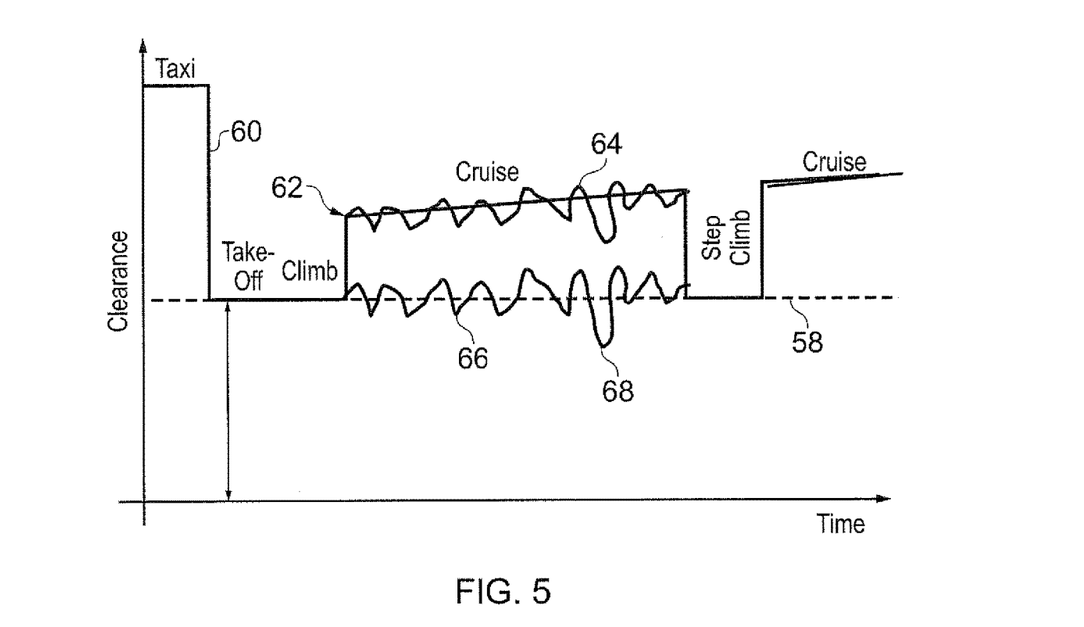
FIG. 5 is an enlargement of part of the schematic graph of FIG. 4.

FIG. 4 is a schematic graph of rotor tip clearance for a rotor in the gas turbine engine 10 as used to power an aircraft. FIG. 5 is an enlargement of part of the schematic graph of FIG. 4. The graphs are not to scale. Tip rub occurs when the clearance of at least one rotor blade 38 is zero millimeters. Line 58 represents the predefined minimum clearance. This is greater than 0 mm to allow for measurement uncertainty, different blade lengths, rotor asymmetry and rapid transient effects such as gust loading. Typically the minimum clearance 58 is a few millimeters but the precise size is dependent on the engine 10, the particular rotor stage 34, the accuracy of the tip clearance measurement or estimation, and other factors as will be apparent to the skilled reader.

Line 60 is a typical target clearance without any clearance control. In the taxi phase of a flight the engine 10 is cold and is running at ground idle shaft speeds. Thus the expected clearance is large. In the take-off and climb phases of the flight the engine 10 is run at substantially maximum power demand so the expected clearance reduces significantly.

Typically the rotor stages 34 are designed so that the target clearance 60 in these phases is equal to the minimum clearance 58.

In a first cruise phase of the flight the engine power demand is reduced, resulting in the rapid increase in target clearance 60 seen at point 62. The target clearance 60 increases marginally through an extended cruise phase as thrust is reduced in response to the gradually reducing aircraft weight as fuel is burnt. Superimposed on line 60 in FIG. 5 is an exemplary actual clearance 64 in the cruise phase due to auto-throttle control. Auto-throttle is an aircraft control mechanism in which the pilot sets a desired aircraft speed, for example 0.85 Mach, and the aircraft controller adjusts the demanded thrust in order to deliver that aircraft speed. An engine controller receives the demanded thrust and controls the engine in order to deliver that thrust. This results in frequent very rapid changes in the thrust demand and consequent rapid variations of actual clearance 64. The target clearance 60 in the cruise phase must therefore be large enough that none of the transient decreases in actual clearance 64 will result in a clearance less than the minimum clearance 58 since there is then a risk of tip rub of one or more of the rotor blades 38.

In a step climb flight phase the engine power demand is again increased rapidly and the clearance consequently eroded. Step climb is an example of slam acceleration to maximum climb thrust. The target clearance 60 is generally designed to equal the minimum clearance 58 during step climb. The target clearance 60 during the cruise phase is therefore normally sufficient to allow slam acceleration to maximum climb thrust. A step climb phase is typically followed by another cruise phase in which the target clearance 60 and actual clearance 64 continue from their values before the step climb.

It is beneficial to minimise the area between the target clearance 60 and minimum clearance 58 since this improves the efficiency of the engine 10. A tip clearance control arrangement can be used to control to a target clearance 60 during cruise that equals, or at least approaches, the minimum clearance 58.

Figure 6:
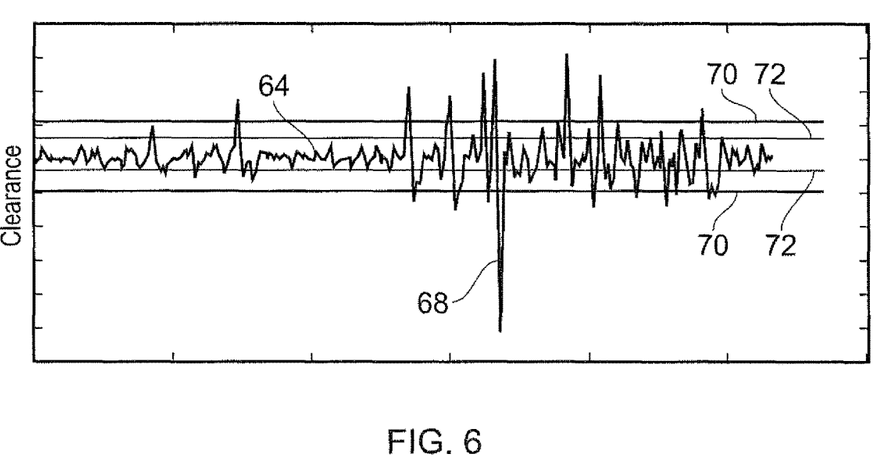
FIG. 6 is a graph illustrating control bands for rotor tip clearance control.

FIG. 6 illustrates exemplary control bands 70, 72 that may be set around the target clearance 60. The wider control band 70 triggers the clearance control arrangement only where the variation of actual clearance 66 from target clearance 60 is large, therefore reducing the risk of tip rub. The narrower control band 72 triggers the clearance control arrangement where the variation of actual clearance 66 from target clearance 60 is modest, so the risk of tip rub is smaller than for the wider control band 70 but the clearance control arrangement is triggered more frequently, thereby increasing wear.

Where a large reduction in actual clearance 66 caused by auto-throttle controlling coincides with errors in tip clearance measurement or estimation and/or with gust loads or similar factors there is an increased risk of tip rub. In particular, a large reduction in clearance as indicated at 68, which significantly exceeds whichever control band 70, 72 is used, may not be controlled quickly enough after the clearance control arrangement is triggered to avoid tip rub.

Figure 7:
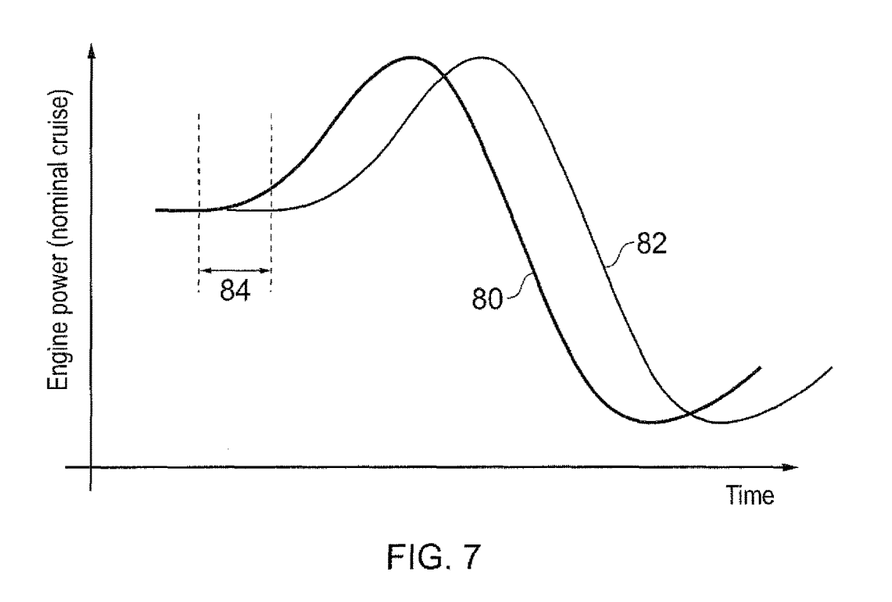
FIG. 7 is a graph of engine power against time.

FIG. 7 is a graph showing engine power against time. An exemplary engine power demand curve 80 is shown, which may be an oscillation due to auto-throttle. The engine power response curve 82 has substantially the same shape as the demand curve 80. However, the engine power response curve 82 lags behind the engine power demand curve 80 by a time period indicated by the double-headed arrow 84. The time lag 84 is dependent on the engine 10, the control iteration, engine power condition, environmental and other factors. The time lag 84 is in the range 100 to 2000 milliseconds, preferably 500 to 1000 milliseconds.

Figure 8:
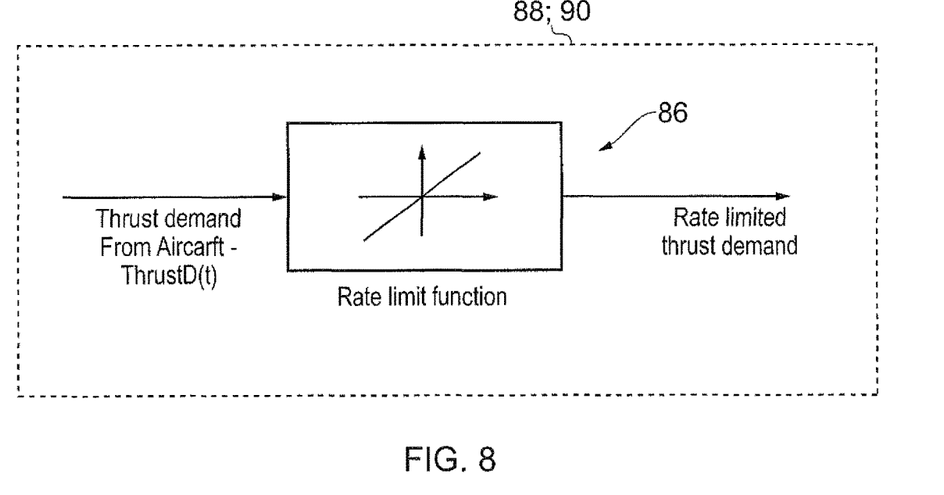
FIGS. 8, 9, 10 and 11 are schematic illustrations of a thrust rate limiter according to the invention.

Turning now to FIG. 8, there is illustrated a thrust rate limiter 86 which is provided in an engine controller 88, in this case a full authority digital engine controller (FADEC), which is associated with the gas turbine engine 10 of an aircraft. In this embodiment, the engine controller 88 is mounted on the engine 10. In another embodiment, the engine controller 88 is located on board the aircraft, remote from, but in communication with, the engine 10.

The engine controller 88 is configured to receive a thrust demand input signal ThrustD(t) from a flight management system of the aircraft, for example according to the throttle lever angle set by the pilot or a command from the auto-throttle. The engine controller 88 is further configured to provide a fuel flow output signal (not shown) to a fuel metering unit in order to provide the required fuel flow which will accelerate (or decelerate) the engine 10 and produce the level of thrust demanded by the flight management system. In this way the engine controller 88 can maintain engine thrust at a specified level for a given throttle position.

The effect of the thrust rate limiter 86 is to limit the input thrust demand signal ThrustD(t) such that the output thrust demand changes no faster than a specified thrust rate limit. The value of the thrust rate limit is chosen or determined according to the known growth (expansion/contraction) time constants of the rotor stage 34 and/or casing 42 of the engine 10, since the expansion/contraction of the rotor hub 36, the rotor blades 38 and the casing 42 is a function of engine speed and gas temperature. Hence, the thrust rate limit is selected such that the rotational speed and gas temperature of the engine, and therefore the thrust produced, will be adjusted only at a rate which is compatible with the growth rate of the rotor stage 34 and casing 42, so as to ensure that the tip clearance will be sufficient to avoid tip rub even when a rapid increase in thrust is demanded. It will be apparent to the skilled reader that the thrust rate limit may be determined in a number of ways, for example using a look-up table or similar. The thrust rate limit may typically be between 10 and 50 seconds but may take other values as will be understood by the skilled reader.

Optionally, a tip clearance control system of the type discussed hereinabove is used in conjunction with the thrust rate limiter 86 in order to adjust the clearance gap and thereby minimise the delay in the application of the demanded thrust. That is, the tip clearance control system may be employed actively to change the size of the clearance gap as quickly as possible so that the demanded thrust level may be reached more swiftly.

In the embodiment of FIG. 8, the thrust rate limiter 86 is implemented in the engine controller 88, wherein the processed (modified) thrust demand signal ThrustD(t) is PLA (pilot lever angle), EPR (engine pressure ratio) or N1 (engine fan speed). In another embodiment, the thrust rate limiter 86 is implemented in the aircraft flight management system 90, wherein the rate limit is applied to the PLA before the signal is passed to the engine controller 88.

Figure 9:
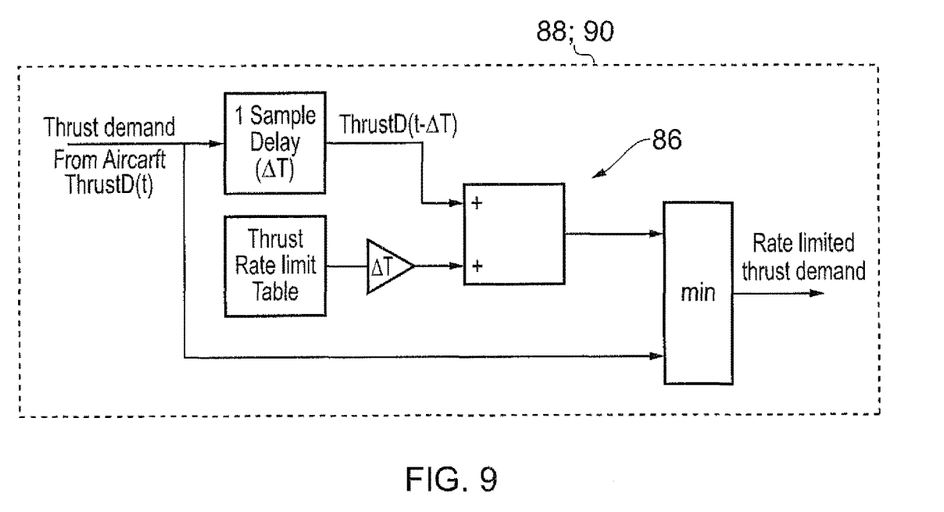

In an embodiment which is shown in FIG. 9, it is determined whether the current thrust demand signal ThrustD(t) has changed at a rate which is less than a predefined thrust rate limit, by calculating what the maximum signal would have been if it was increasing at the said rate limit and taking as the output the smaller of the current thrust demand signal ThrustD(t) and the said value, in order to ensure that the output never changes at a rate higher than the predefined thrust rate limit.

Figure 10:
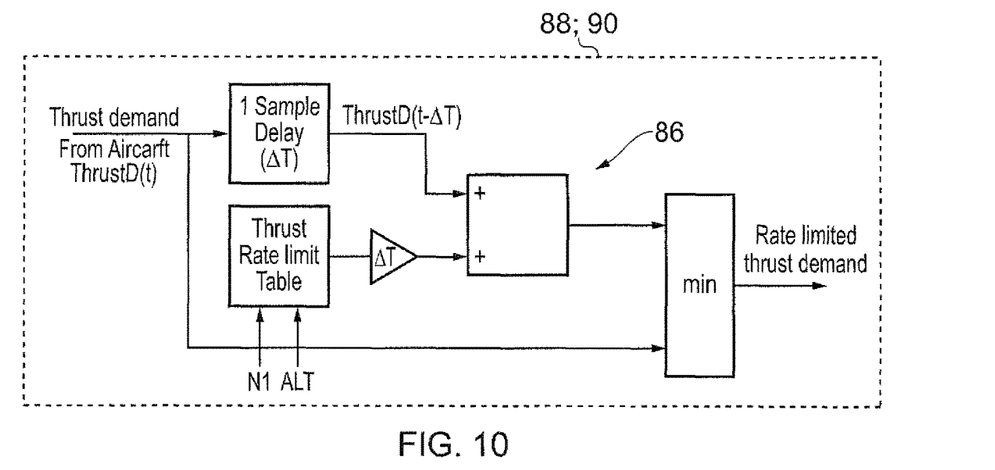

In an embodiment which is shown in FIG. 10, the thrust rate limit is dependent on engine 10 and/or aircraft parameters, in this case N1RT20 (fan 14 core inlet temperature, corrected for altitude) and ALT (aircraft altitude). In another embodiment, the thrust rate limit is dependent on P30 (high pressure compressor 18 outlet pressure) and ALT. In another embodiment, the thrust rate limit is dependent on NH (high pressure turbine 22 speed) and ALT. In another embodiment, the thrust rate limit is dependent on NHRT3 (high pressure turbine 22 temperature, corrected for altitude) and ALT. Other parameters may be used with regard to the thrust rate limit as will be apparent to the skilled reader.

In an embodiment, the thrust rate limit is applied to the thrust demand signal ThrustD(t) according to sensed aircraft data such as longitudinal, lateral and vertical accelerations and flight control surface movements, for example as may be encountered in a gust scenario, in order to adjust the acceleration schedule of the engine 10 to match the real state of the aircraft. In an embodiment, the true Mach number of the aircraft is estimated, in a conventional way as will be apparent to the skilled reader, and any gust-induced noise that affects the sensed aircraft data, but which is not of sufficient duration to affect the actual aircraft speed, is smoothed using a model-based filter, such as a Kalman filter or a complementary filter.

Figure 11:
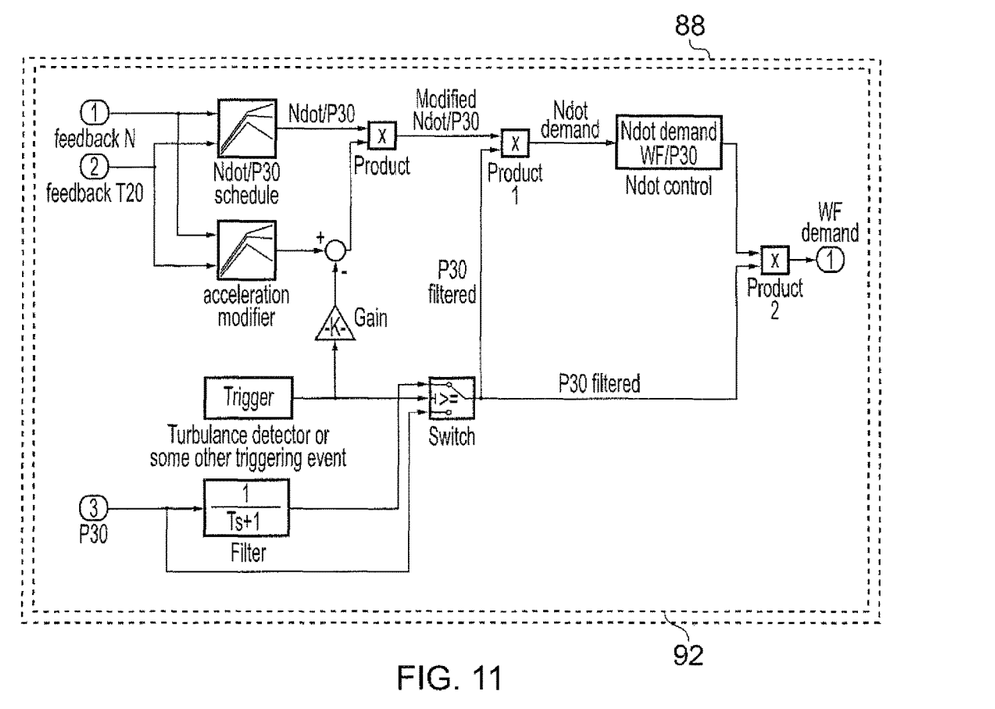

FIG. 11 shows an acceleration control unit (ACU) 92 which comprises an element of the engine controller 88. In this embodiment, acceleration of the engine 10 is controlled to an Ndot control schedule (acceleration schedule or look-up table) in the event of an engine transient. The adaptive control employs a closed loop control of Ndot for engine accelerations when a transient-triggering event, for example clear air turbulence, is detected, whereupon the ACU control loop, and not the Engine Pressure Ratio (EPR) loop, has authority. To protect the engine 10 from tip rub, an acceleration modifier is multiplied to the Ndot schedule, effectively reducing the Ndot command or set point, and hence the fuel flow WF to the fuel metering unit. Thus the adaptive control which is implemented in the ACU 92 is effectively a lower level authority of control, wherein the acceleration modifier is used to apply, indirectly, a thrust rate limit to the thrust demand signal ThrustD(t) which is received by the engine controller 88 or flight management system 90.

Additionally, the ACU 92 is a slave to the pilot lever angle (PLA) control and runs at a faster rate of computation so there is a combination of delayed/lagged thrust demand and ACU 92 control in the transient detect mode with or without clear air turbulence.

Figure 12:
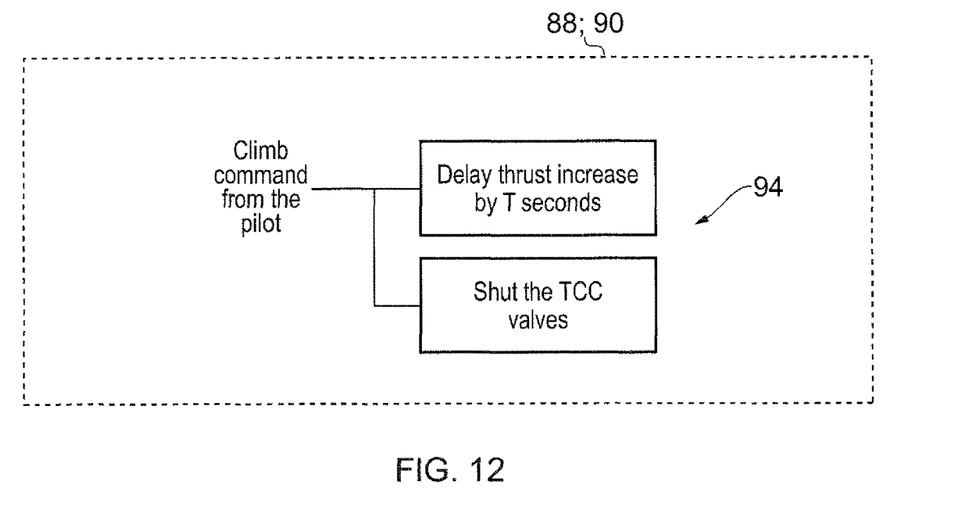
FIGS. 12 and 13 are schematic illustrations of thrust delay means according to the invention.

FIG. 12 illustrates an embodiment of the invention wherein the engine controller 88 is provided with thrust delay means 94. In this embodiment, a delay of period T seconds is applied to a climb thrust demand signal ThrustD(t) while the tip clearance control TCC system is instructed to increase the tip clearance.

Figure 13:
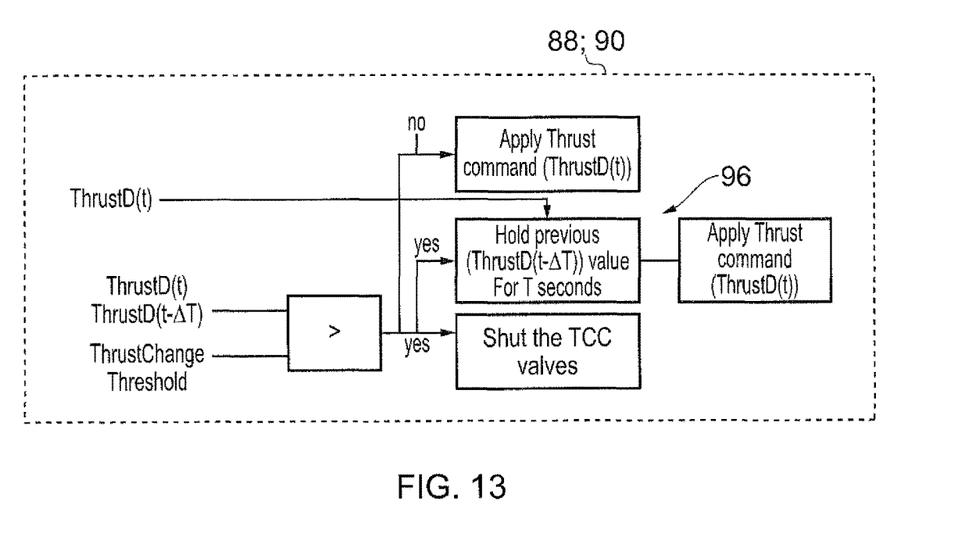

In an embodiment which is shown in FIG. 13, the engine controller 88 is provided with thrust delay control means 96. If it is determined that the current thrust demand signal ThrustD(t) exceeds a threshold value, the current thrust output demand value is maintained for a period T seconds while the tip clearance control TCC system is instructed to increase the tip clearance before the demanded thrust is applied.

The effect of applying the thrust delay to the thrust demand signal ThrustD(t) is to provide the tip clearance control system TCC with sufficient time to adjust the tip clearance and so avoid tip rub even when a rapid increase in thrust is demanded.

In the embodiments of FIGS. 12 and 13, the thrust demand delay is implemented in the engine controller 88. In other embodiments, the thrust demand delay is provided in the aircraft flight management system 90 and the thrust demand signal ThrustD(t) is processed (modified) therein before being passed to the engine controller 88.

The invention provides that the thrust demand signal ThrustD(t) may be modified using the thrust rate limiter 86 alone, the thrust delay means 94 alone, the thrust delay control means 96 alone, or any combination of the thrust rate limiter 86, the thrust delay means 94, and the thrust delay control means 96.

The skilled reader will appreciate that the flight management system 90 and/or engine controller 88 may be configured to override the thrust rate limiter 86 and/or the thrust delay (control) means 94, 96 in circumstances where a rapid increase in engine thrust is required even at the expense of tip rub, for example during a missed approach or an emergency manoeuvre.

Figure 14:
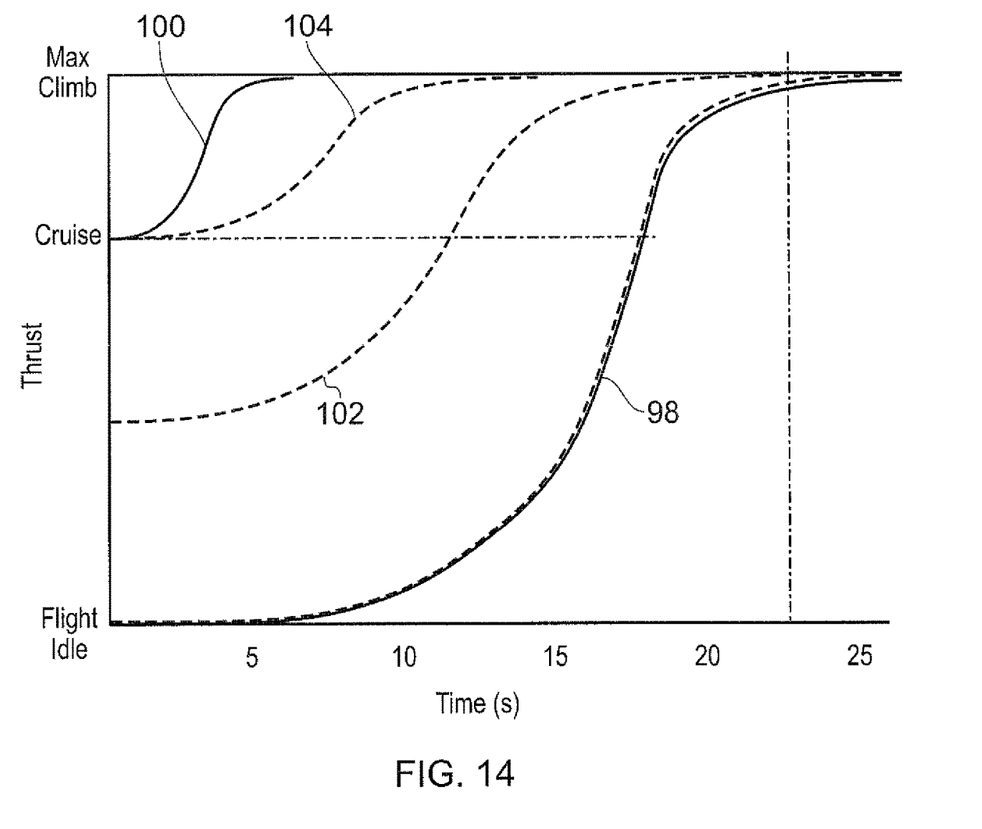
FIG. 14 is a graph of engine thrust against time.

FIG. 14 shows representative plots of thrust against time. Line 98 represents a mandatory certification requirement that the engine 10 is able to accelerate from flight idle to 95% of rated thrust within 23 seconds. Line 100 shows that the engine 10 is known to be able to reach this level of thrust within about 5 seconds from the cruise throttle setting. Lines 102 and 104 show a more gradual increase in thrust which is achieved when the acceleration of the engine is limited and/or delayed by modification of the thrust demand signal ThrustD(t) in accordance with the invention.

Thus the invention is based on the realisation that, since there is no mandatory certification requirement regarding the time taken to reach maximum thrust from throttle settings other than flight idle (e.g. cruise), in these circumstances the engine 10 may be automatically controlled to accelerate at a lesser, unconventional rate in such a way as to avoid tip rub and thereby improve fuel efficiency.

Figure 15:
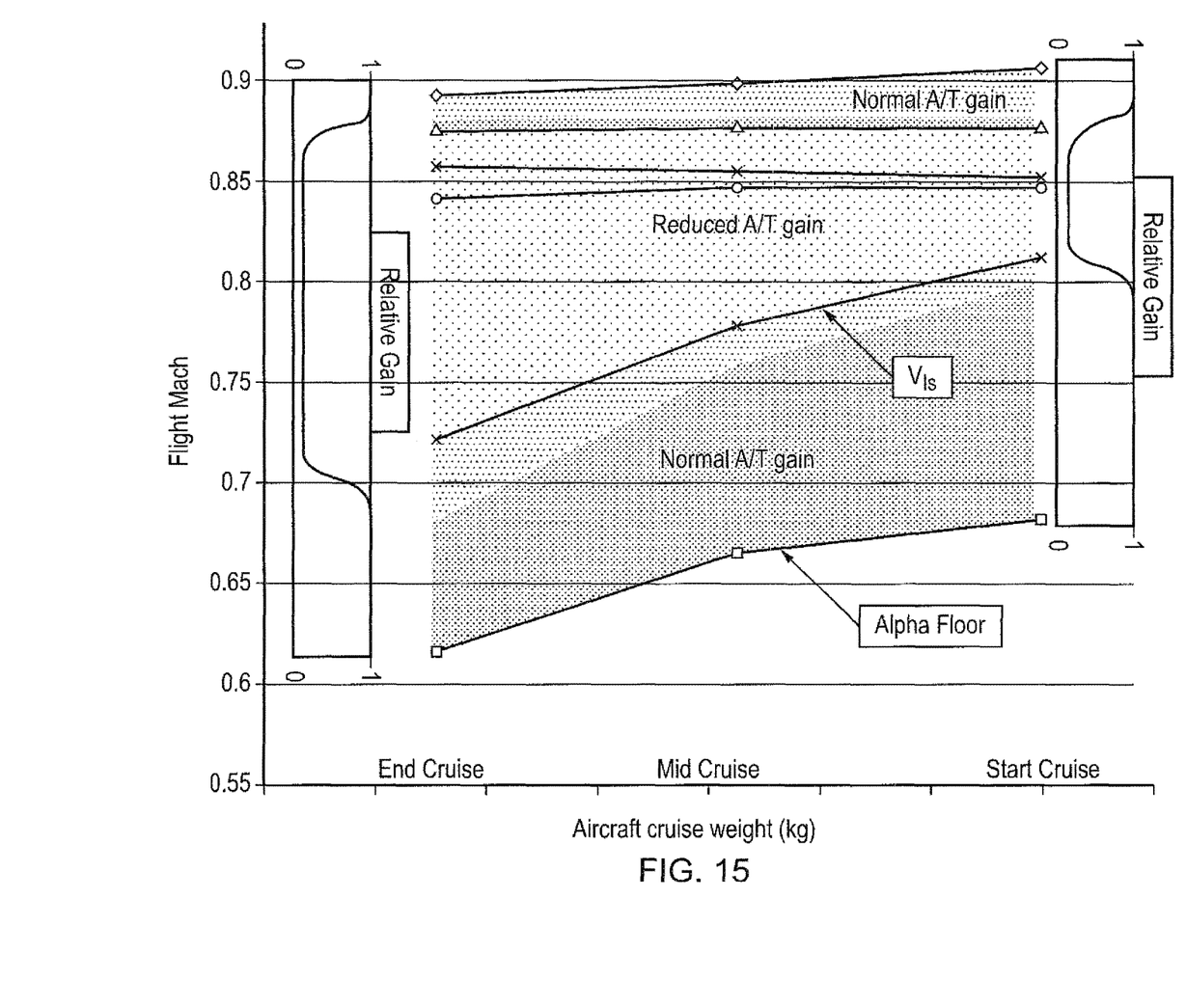
FIG. 15 is a graph showing a schedule for determining in which mode the aircraft engine is to be operated.

FIG. 15 illustrates a further embodiment of the invention. It has been found that, under some circumstances, aircraft conditions may require relatively rapid engine accelerations, and so prevent the engine from being accelerated in accordance with growth time constants of a rotor and/or a casing of the gas turbine engine during cruise. For example, the aircraft weight or speed may be such that the engine acceleration in accordance with growth time constants of the rotor and/or casing may result in aircraft performance which may be inadequate to satisfy aircraft regulatory constraints, such as time to climb requirements.

Consequently, the method may comprise controlling the gas turbine engine in accordance with one of a first mode and second mode. When operated in accordance with the first mode, the engine is operated in accordance with the method outlined above, in which the engine is accelerated in accordance with growth time constants of a rotor and/or a casing of the gas turbine engine during cruise, such as by applying a predetermined thrust rate limit or a time lag to the thrust demand signal. When operated in accordance with the second mode, the engine is accelerated directly in accordance with the thrust demand signal. When in the first mode, the turbine target tip clearance can be reduced, thereby saving fuel. When in the second mode, the turbine tip clearance must be maintained at a relatively large clearance in order to accommodate rapid increases in engine thrust.

The engine 10 is operated in accordance with either the first or second mode in accordance with an operating schedule illustrated in FIG. 15. Engine operation in the first mode is indicated in the area of the graph labelled "reduced A/T gain", while operation in the second mode is indicated in the area of the graph labelled "Normal A/T gain". The x axis shows aircraft weight in terms of typical weights at the beginning, middle and end of the cruise. As would be understood by the skilled person, the aircraft weight reduces during flight as fuel is burnt. The y axis shows aircraft speed in terms of Mach number, though the schedule could be determined on the basis a different indication of airspeed. A transition region is indicated in dark grey, in which the engine is operated in accordance with the first method, but with different thrust rate limit/time lag being applied compared to the reduced A/T gain region.

For example, at the start of cruise, where the aircraft is heaviest, the engine may be operated in the second mode at speeds below Mach 0.81, or speeds above Mach 0.88. This is because at these weights, a relatively large amount of thrust is required to attain the necessary acceleration to achieve adequate performance margins. Consequently, it may be unacceptable to delay or restrict engine acceleration. By the end of cruise however, the speeds at which the aircraft can be operated in the first mode has broadened to between Mach 0.72 and Mach 0.88, due to the reduced weight of the aircraft. When operated in this mode, this turbine tip clearance is kept small. At all other operations speeds and weights, the engine is operated in the second mode, and the turbine tip clearance is increased.

Sudden changes between engine operating modes are prevented by providing a transition region within the schedule. Within the transition region, (such as between Mach 0.8 and Mach 0.81 when the aircraft is at the start of cruise), the engine is operated in the first mode, but with either a higher thrust rate limit or a shorter time lag compared to when the engine is operated in the green region. The time lag is modified in accordance with speed in a manner as shown by the "relative gain" section of FIG. 15. For example, the time lag may be 1000 milliseconds at Mach 0.81 and high weight, declining to 0 by Mach 0.8. The turbine tip clearance is correspondingly increased as the time lag is reduced/thrust rate limit is increased, in order to accommodate the higher acceleration rates. Alternatively, the transition region may be omitted, and the switch between first and second modes may be direct. In this case, the schedule may be adjusted in accordance with the direction of speed change, i.e. if the aircraft is within the first mode region and speed is increasing, the upper limit of the first mode region may be higher than if the aircraft is in the second mode, above the maximum speed of the first mode region, and the speed is reducing. Consequently, a hysteresis effect is introduced, and so constant switching between the two modes can be prevented where the aircraft is operated close to this boundary.

Alternatively or in addition, the operating mode may be determined in accordance with flight conditions such as one or more of, margin to stall, angle of attack, likelihood of turbulence, a signal from a traffic collision avoidance system, and windshear. So for example, the aircraft may be operated in the second mode if any of the following conditions are true in addition to the schedule shown in FIG. 15:

there is a predicted high likelihood of windshear or a windshear greater than a predetermined minimum is experienced by the aircraft;
a signal indicative of a risk of a collision is received from a traffic collision avoidance system is received;
the aircraft is operating within a predetermined margin of stall conditions (as indicated for example, by a signal sent from the flight management system, which could be calculated for example on the basis of aircraft airspeed, air temperature, aircraft weight, altitude etc);

the aircraft is operating close to a maximum angle of attack (which could again be provided in the form of a signal from an aircraft flight management system);

there is a high predicted likelihood of turbulence, or the aircraft is experiencing turbulence.

Furthermore, control of the engine 10 in accordance with the invention may provide a reduction in thermo-mechanical fatigue, since the engine 10 is subjected to fewer rapid acceleration cycles over the duration of its service life.

The control method of the invention may be encompassed in computer-implemented code and may be stored on a computer-readable medium. The invention may thus be a computer-implemented control method and a computer-implemented control system for preventing tip rub in a gas turbine engine, in particular an aircraft gas turbine engine. The computer may be (an element of) an electronic engine controller, for example a full authority digital engine controller (FADEC), including an acceleration control unit, or alternatively may be (an element of) a flight management system or auto-throttle. Advantageously, the control method may be programmed into an existing engine controller, flight management system, or other appropriate computer, i.e. the invention is "retrofittable".

It will be understood that the invention has been described in relation to its preferred embodiments and may be modified in many different ways without departing from the scope of the invention as defined by the accompanying claims.

Although a three-shaft gas turbine engine 10 has been described the invention is equally applicable to a two-shaft gas turbine engine. As will be apparent to the skilled reader, the invention is felicitous in use for the rotor stages of gas turbine engines used for other purposes than to power an aircraft, for example industrial gas turbine engines or marine gas turbine engines.

The invention claimed is:

1. A method of controlling a gas turbine engine, the method comprising:
   providing a thrust demand signal to a processor associated with the gas turbine engine;
   modifying the thrust demand signal according to growth time constants of a rotor and/or a casing of the gas turbine engine to control a rotational speed, or a rate of change of rotational speed, of the gas turbine engine to prevent contact between the rotor and the casing; and
   controlling engine thrust in accordance with the modified thrust demand signal.

2. The method of controlling a gas turbine engine according to claim 1, wherein the processor is one of: (i) an element of a flight management system of an aircraft, and (ii) an element of an auto-throttle.

3. The method of controlling a gas turbine engine according to claim 1, wherein the processor is an element of an electronic engine controller.

4. The method of controlling a gas turbine engine according to claim 1, wherein modifying the thrust demand signal comprises one or both of:
   applying a delay to the thrust demand signal to allow a gap between the rotor and the casing to be adjusted before a demanded thrust is applied, optionally determining a duration of the delay according to a threshold value of the thrust demand signal; and
   applying a thrust rate limit to the thrust demand signal.

5. The method of controlling a gas turbine engine according to claim 4, wherein applying the thrust rate limit applies an acceleration modifier to an acceleration schedule set point in an acceleration controller of an electronic engine controller.

6. The method of controlling a gas turbine engine according to claim 4, wherein the gas turbine engine is an aircraft engine and applying the thrust rate limit to the thrust demand signal includes selecting the thrust rate limit according to aircraft and/or engine parameters.

7. The method according to claim 1, further comprising a step of determining whether the gas turbine engine can be operated in:
   a first mode, in which the thrust demand signal is modified according to growth time constants of the rotor and/or the casing of the gas turbine engine to control the rotational speed, or the rate of change of rotational speed, of the gas turbine engine to prevent contact between the rotor and the casing; or
   a second mode, in which the gas turbine engine is controlled in accordance with the thrust demand signal.

8. The method according to claim 7, wherein the step of determining comprises operating the gas turbine engine in either the first mode or the second mode in accordance with a schedule based on at least one of: aircraft airspeed, aircraft weight, margin to stall, angle of attack, likelihood of turbulence, a signal from a traffic collision avoidance system, and windshear.

9. The method according to claim 1, wherein the step of modifying the thrust demand signal comprises applying a delay to the thrust demand signal, and/or applying a thrust rate limit having a value in accordance with a schedule based on at least one of aircraft airspeed and aircraft weight.

10. A computer program, having instructions adapted to carry out the method of controlling a gas turbine engine according to claim 1.

11. A computer readable medium, having a computer program recorded thereon, wherein the computer program is adapted to make a computer execute the method of controlling a gas turbine engine according to claim 1.

12. A processor for controlling a gas turbine engine, the processor comprising a signal modifier, wherein:
   the processor is configured to receive a thrust demand signal;
   the signal modifier is adapted to modify the received thrust demand signal according to growth time constants of a rotor and/or a casing of the gas turbine engine to control a rotational speed, or a rate of change of rotational speed, of the gas turbine engine to prevent contact between the rotor and the casing; and
   the processor is configured to control engine thrust in accordance with the modified thrust demand signal.

13. The processor for controlling a gas turbine engine according to claim 12, wherein the signal modifier comprises a delay, which is applicable to the thrust demand signal, and, optionally, a duration of the delay is determined according to a threshold value of the thrust demand signal.

14. The processor for controlling a gas turbine engine according to claim 12, wherein the signal modifier comprises a thrust rate limit applicable to the thrust demand signal.

15. The processor for controlling a gas turbine engine according to claim 12, wherein the signal modifier comprises a delay and a thrust rate limit applicable to the thrust demand signal.

16. The processor for controlling a gas turbine engine according to claim 14, wherein the thrust rate limit comprises an acceleration modifier applicable to an acceleration schedule set point in an acceleration controller of the processor.

17. An aircraft flight management system, comprising the processor according to claim 12.

18. An electronic engine controller, comprising the processor according to claim 12.

19. A gas turbine engine control system, comprising the processor according to claim 12.

* * * * *